United States Patent [19]

Brennecke et al.

[11] Patent Number: 5,018,585
[45] Date of Patent: May 28, 1991

[54] SAFETY DEVICE TO RELIEVE EXPLOSIVE PRESSURES

[75] Inventors: Hermann Brennecke, Darmstadt; Horst Liere, Eppertshausen, both of Fed. Rep. of Germany

[73] Assignee: Alfo AG, Muntelier, Switzerland

[21] Appl. No.: 388,231

[22] Filed: Aug. 2, 1989

[30] Foreign Application Priority Data

Sep. 20, 1988 [DE] Fed. Rep. of Germany ....... 3831828

[51] Int. Cl.[5] .......................... A62C 3/04; A62C 2/06; A62C 3/00; A62C 2/00
[52] U.S. Cl. ........................................ 169/48; 169/45; 169/54; 169/56; 98/1
[58] Field of Search ...................... 169/48, 49, 54, 56, 169/45, 61, 70; 137/79, 78.1, 81.1, 78.5; 251/1.2; 98/1

[56] References Cited

U.S. PATENT DOCUMENTS

| 347,797 | 8/1886 | Hexamer ........................... 169/54 X |
|---|---|---|
| 1,709,949 | 4/1929 | Rasmussen et al. ............. 251/1.2 X |
| 1,906,151 | 4/1933 | Goodman . |
| 3,763,936 | 10/1973 | Menage .............................. 169/56 X |
| 3,831,318 | 8/1974 | Richmond ......................... 169/49 X |
| 3,871,458 | 3/1975 | Dumazet ........................... 169/56 X |
| 4,143,670 | 3/1979 | Olson et al. ....................... 169/56 X |
| 4,519,458 | 5/1985 | Kroeter ................................ 169/56 |

FOREIGN PATENT DOCUMENTS

| 1900272 | 8/1970 | Fed. Rep. of Germany ........ 169/54 |
|---|---|---|
| 254328 | 2/1988 | Fed. Rep. of Germany ........ 169/48 |
| 3641433 | 6/1988 | Fed. Rep. of Germany ............ 98/1 |
| 2620034 | 3/1989 | France ................................. 169/45 |
| 427720 | 4/1975 | U.S.S.R. .............................. 169/54 |
| 629935 | 10/1978 | U.S.S.R. .............................. 169/48 |
| 1134203 | 1/1985 | U.S.S.R. .............................. 169/70 |
| 1431774 | 10/1988 | U.S.S.R. .............................. 169/48 |

*Primary Examiner*—Johnny D. Cherry
*Assistant Examiner*—James M. Kannofsky
*Attorney, Agent, or Firm*—Frishauf, Holtz, Goodman & Woodward

[57] ABSTRACT

To relieve explosive pressures due to unintended explosion of explosive fluid, for example dust or combustible particle-laden air, such as sawdust, coal dust and the like, or of combustible gases, passing through a conveying duct (2, 5), a chamber is formed with a releasable closure, the inlet duct end (2a) from the inlet conveying duct terminating in the chamber. The chamber is formed by a cylindrical wall structure (3a) surrounding the inlet duct end (2a) with clearance. An explosion and/or flame detector (D) is located to sense an incipient explosion or flame and providing an electrical output signal. The chamber is subdivided into chamber portions, one in communication with the inlet duct end and the other communicating with the outlet from the chamber by a rapid-acting separating arrangement. In one form, the separating arrangement is a ring membrane which is distended between the walls of the chamber, under fluid pressure, released against the back of the membrane under control of the explosion detector (D); alternatively, the walls of the chamber can be perforated to form spray nozzles, through which under control of the detector, pressurized extinguishing medium is sprayed to form a sheet or curtain of extinguishing substance across the chamber.

15 Claims, 2 Drawing Sheets

SAFETY DEVICE TO RELIEVE EXPLOSIVE PRESSURES

The present invention relates to an apparatus and device to relieve explosive pressure in chambers or fluid lines, and more particularly to relieve explosive pressure in ducts, conduits, pipes or hoses through which potentially explosive fluids are passed.

BACKGROUND

Frequently, conduits, ducts, hoses, pipes and the like conduct explosive fluids from a supply into a chamber. If an explosion occurs, for example in the line, the explosion can travel through the fluid into the chamber; likewise, if an explosion occurs in the chamber, the communicating line can transfer the resulting explosion to the supply chamber. In order to relieve explosive pressures, for example in the receiving chamber, it has previously been proposed to provide the receiving chamber with a protective cap which can open the chamber to the atmosphere. Such protective caps may also be supplied in form of cover plates and the like which are releasable under predetermined stresses, for example stresses due to an explosion.

Explosive fluids which are handled in such apparatus may, for example, be combustion gases, mixtures of air and combustible powder or dust such as sawdust, grains, wheat, coal dust or the like. Flame blocks or chokes are known, but, usually, to protect apparatus against destruction due to explosion, pressure relief valves or pressure relief arrangements are used. As a general principle, an initially closed system is opened upon occurrence of excessive pressure therein; the opening may occur immediately or after some time delay. Thus, the initially closed system is vented, either for a short time or continuously after the occurrence of the explosion. The venting can be directed to a region where no dangerous consequences are expected. Due to the construction of such venting arrangements, build-up of excessive explosion pressure within the overall system is prevented and thus bursting of components of the system due to the explosion likewise is prevented.

A flame front within ducts, pipes or the like can be inhibited from progressing along the duct by directing the line coming from the explosion site directly to the protective opening cap or region; lines or ducts which are to continue to supply materials from the chamber then are coupled to the chamber from the opposite end thereof. Thus, an explosion which is transmitted through the line or duct is vented quickly into space, directed, usually, upwardly. Any explosive force which may propagate towards the downwardly directed further connecting line would occur with substantially lesser speed and under reduced pressure, and hence dangerous conditions.

THE INVENTION

It is an object to provide an arrangement in which propagation of explosive pressures to a removal line is not only braked or slowed, but is also effectively entirely inhibited.

Briefly, a rapid-acting separating arrangement is positioned in a fluid passage space in the explosion release chamber, the rapid-acting separating arrangement being coupled to a flame or explosion detector to activate the rapid-acting separating arrangement immediately upon sensing a flame or explosion, thereby separating the inlet and outlet ducts.

In accordance with a feature of the invention, the separating arrangement is a membrane which is secured to one of the walls of the chamber and, upon application of pressure to the membrane, radially projecting the membrane towards the other wall of the chamber, to thereby separate the chamber into two chamber sections, and isolate an inlet from an outlet duct.

The explosion sensing detector is positioned, with respect to the expected origin or site of the explosion such that it senses the occurrence of an explosion before the explosive pressure can propagate to the chamber. This ensures that the connection between the chamber portions is blocked before the explosive front reaches the entire chamber. This permits the protective cap or end plate of the chamber to open, and vent the explosion towards the atmosphere. Yet, propagation of explosive pressure through a line, duct, pipe or the like extending from the chamber to a further structural element is inhibited. In this manner, the very same structural element which permits venting or release of explosive pressure can also be used to interrupt the transfer of explosive pressure along the duct work of the system and thus reliably ensures that explosive force is not propagated therethrough.

In accordance with a feature of the invention, the rapid-acting valve or closure separating system is provided in form of a ring membrane which is located in a space between the supply line of the potentially explosive fluid and the chamber. In its quiescent position, the membrane leaves a free space which permits ready passage of the potentially explosive fluid. If the explosion detector senses the presence of an explosion, the membrane is hydraulically or pneumatically expanded and brought into closing position by extending the membrane towards an opposite wall portion of the chamber and thus separating the system into a portion where the explosion occurred and another portion which is thereby protected.

Minimum space for the system can be obtained by locating the membrane in a wall of the chamber and provide a pressure system which radially extends the chamber inwardly against the supply line, forming a chamber wall. The membrane is so located within the chamber that, in its quiescent position, it is flush with the chamber wall, and closes off the chamber wall. This provides a free flow space between the regions of the chamber without any projections or obstructions which might interfere with the free flow. This is of particular advantage if the fluid to be supplied comprises a mixture of powder, dust, granules or the like, in air. Such mixtures have the tendency to form deposits on any projections and form constrictions of the cross-sectional diameter of the flow ducts through which the mixture is to circulate.

The membrane, when closed, should provide a reliable tight closure with respect to an opposite wall portion. In accordance with a feature of the invention, the supply for the potentially explosive fluid may have an elongated cylindrical portion which is located coaxially with respect the ring membrane, radially spaced from the membrane by the same distance throughout, and thereby forms a relative large sealing surface.

Rapid extension of the membrane from the quiescent position into the closed position is obtained, in accordance with a preferred feature of the invention, by a pressure source which is connected via a valve to the outside of the membrane. The valve is triggered by a signal from the pressure or flame sensor and, upon opening, permits rapid pulse-like supply of pressurized fluid from the pressure source, which causes the membrane to extend abruptly from open into closed condition.

In accordance with another feature of the invention, the separating arrangement may be formed by a curtain or sheet of finely dispersed extinguishing substance. The extinguishing substance, which may be water, can be supplied through a wall of the chamber and through a substantial number of bores, for spraying internally towards the supply line which contains the potentially explosive material. A continuous dense sheet of extinguishing substance will result which quenches and extinguishes any flames reaching this sheet of extinguishing material.

Rapid injecting of spray of extinguishing material is obtained, in accordance with a feature of the invention, by retaining it in a pressure vessel which is coupled through one or more valves to the bores in the wall of the chamber.

The chamber, as referred to herein, may be formed not only by a simple wall, but also by wall portions or sections which have structures secured therein containing spray nozzles and the like, which may be integrated with supply ducts and/or the valves which control spraying of the sheet of extinguishing material. A flame detector is provided which triggers the spray of extinguishing material.

DRAWINGS

DETAILED DESCRIPTION

Figure 1:
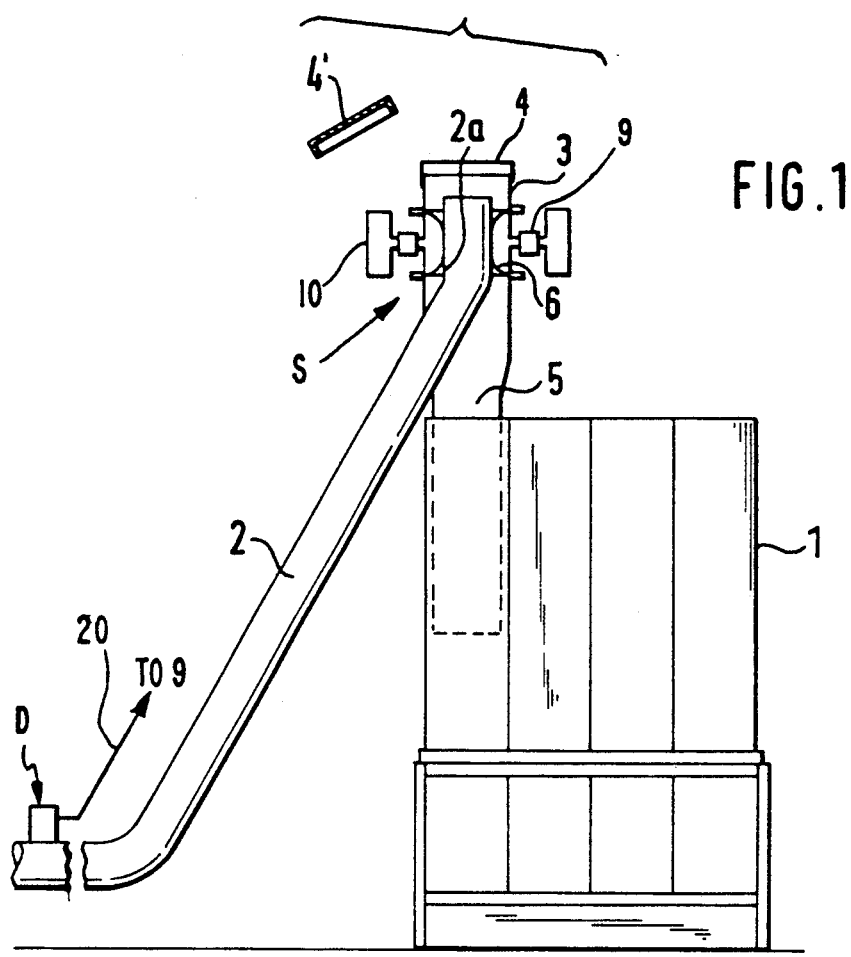
FIG. 1 is a side view illustrating an embodiment of the invention applied to a filter housing.

A filter housing 1 (FIGS. 1, 3) has a plurality of filters located therein, for example in form of pockets with filter substance, filter tubes or the like. Such filters are frequently and customarily used for separating dust, powder, or other particles from transporting air. The wood-working industry uses filters of this type for separation of sawdust. Potentially explosive fuel-air mixtures may occur at any time. Filter structures are therefore usually placed out in the open, at a predetermined safety distance from all other structures or buildings. They are usually provided with a pressure release arrangement.

The mixture of air and potentially explosive dust particles, potentially explosive gases and the like, are supplied to the filter 1 through an inlet or incoming conveying duct 2. The duct 2 has an inlet duct end 2a which terminates in the chamber 3. The inlet duct 2a is vertical and, opposite the exit opening of the cylindrical vertically extending duct 2a, a cover plate 4 is located. This cover plate 4 is attached to the top portion of the wall defining the chamber 3 by break connections, over a clamping arrangement, loaded by weights, or the like, or by other well known arrangements, so that it can become free from the chamber 3. When a predetermined pressure within the chamber 3 is exceeded, the cover 4 can fly off, as shown at 4' in FIG. 1.

The chamber 3 extends, as shown at 5a (FIG. 2), at its bottom side towards an outlet conveying duct 5 which, then, extends into the filter structure proper. The fluid medium, thus, is deflected over 180° upon passage from the supply conveying duct 2 to the removal conveying duct 5.

In accordance with a feature of the invention, the chamber 3 is cylindrical, and located coaxially with respect to the inlet duct end 2a, so that the chamber 3 can be subdivided by a rapid-action separating arrangement S (FIG. 1).

Figure 2:
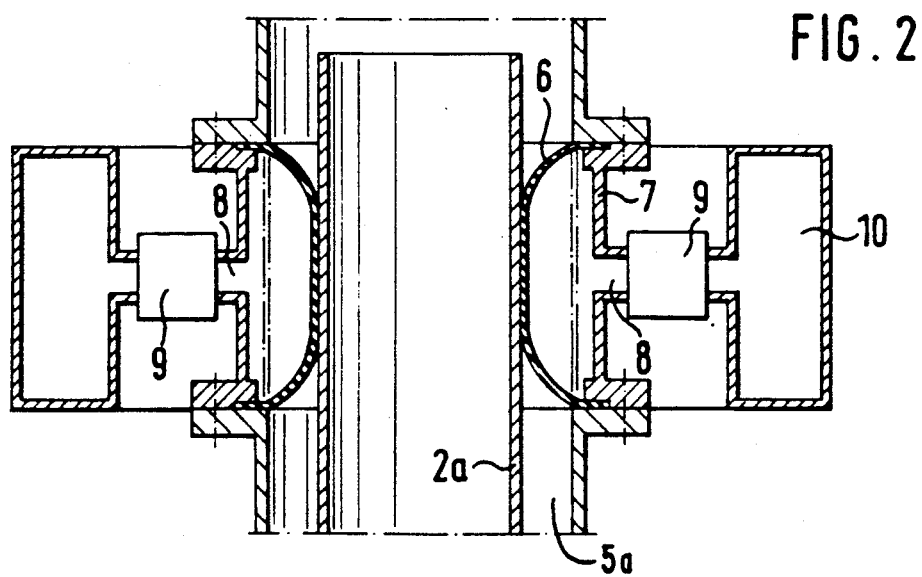
FIG. 2 is an enlarged fragmentary cross-sectional view of the apparatus of FIG. 1.

The rapid-acting separating arrangement, in FIGS. 1 and 2, is formed by a ring membrane 6 which is built into the chamber 3 by a valve-, housing-and-retention structure 7.

The cylindrical inlet duct end 2a is extended upwardly beyond alignment with the membrane 6, to form a large and axially extensive sealing surface opposite the ring membrane 6. As required by certain explosive media to be handled, the upwardly extending end portion 2a may be reinforced to be able to accept the pressure of the membrane, as well as explosive pressures.

The valve housing 7 is formed with a plurality of radial bores or openings 8 which, each, are connected via a valve 9 to a common source of pressure supply 10.

The conveying duct 2 has a pressure detector D secured thereto, at a position remote from the chamber 3 (see FIG. 1) which is coupled by a line 20 to the valve 9.

Operation

Upon sensing of an incipient explosion or a flame, the flame and/or explosion detector D provides an output signal to the valve 9, which opens and admits pressurized fluid from the pressure supply 10 through the bores or openings 8 to the membrane 6. This extends the membrane and presses it from the chain-dotted position shown in FIG. 2 to the illustrated closed position. The membrane, then, provides a cylindrical sealing surface of substantial extent, engaging the inlet duct end 2a, and severs or separates the chamber 3 into two portions by closing off communication from the inlet conveying duct 2 to the outlet duct 5.

An explosive front passing from the inlet conveying duct 2 into the chamber thus can propagate only upwardly, by rupturing the connection of the cap 4, so that it will fly off to the position 4'; propagation, 180° deflected from the upward direction of the end duct 2a downwardly is inhibited, thereby protecting the interior components of the filter and preventing further propagation of fire or flame thereto.

Figure 3:
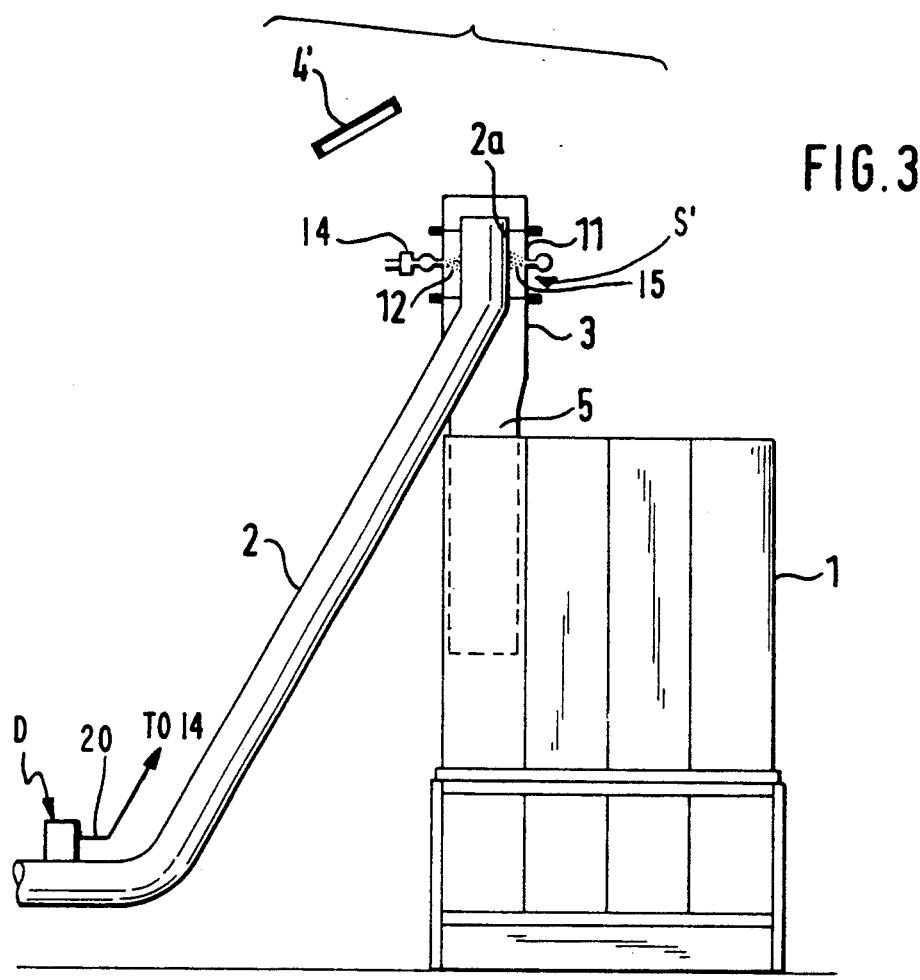
FIG. 3 illustrates another embodiment of the invention applied to a filter housing.

The embodiment of FIG. 3 is similar to that of FIG. 1 except that the separating arrangement is different. Similar elements have been given the same reference numerals and will not be explained again.

The valve housing and retention structure 7 (FIG. 2) is replaced by a flange ring 11 having a plurality of spray nozzles 12 extending from the outside wall 3a into the chamber 3, formed between the walls 3a and the inlet duct end 2a. The nozzles 12 are circumferentially distributed, preferably uniformly, over the circumference of the flange ring 11, and direct spray towards the duct end 2a.

Figure 4:
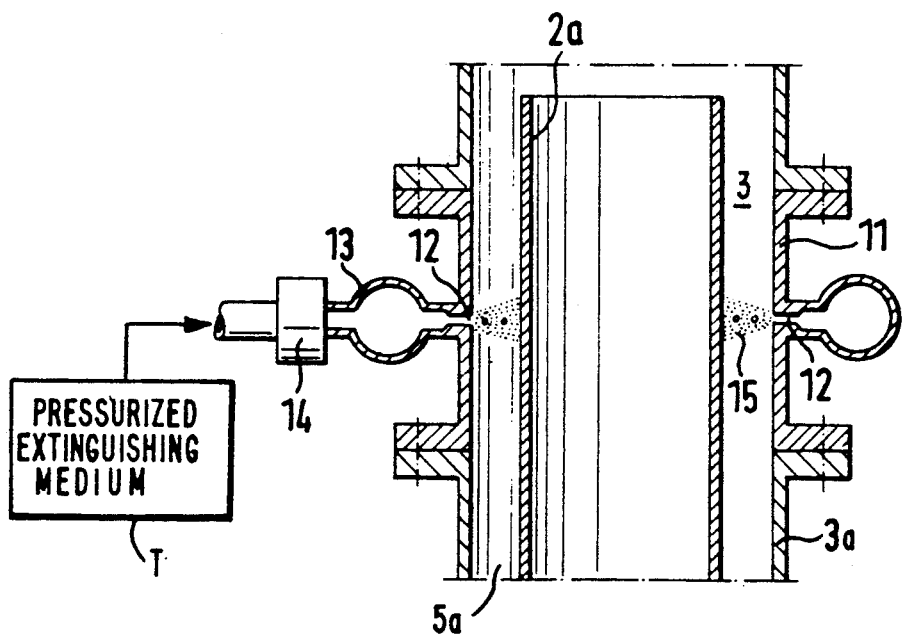
FIG. 4 is an enlarged cross-sectional view showing the separating arrangement of FIG. 3.

As best seen in FIG. 4, the nozzles 12 receive pressurized material from a ring duct 13 which, in turn, is coupled to a supply line, which includes a valve 14. The supply line, shown only schematically, may itself be a ring duct with a plurality of valves 14 therein. A supply tank T is coupled to the supply line, or supply ring duct, filled with extinguishing substance, which is pressurized, preferably highly pressurized.

Operation

Upon detection of a flame or an explosive front, the detector D (FIG. 3) responds and provides an electrical signal. The pressurized extinguishing substance will be emitted from nozzles 12 in form of finely dispersed extinguishing streams which merge with adjacent extinguishing streams to an essentially dense sheet of extinguishing substance.

Triggering of the valve 14 can occur fractions of a second before the explosive front from the region of the location of the flame or explosion detector D reaches the chamber 3, that is, the region between the wall 3a of the chamber and the inlet duct end 2a. At that time, the chamber is already separated into two chamber portions by the sheet of extinguishing substance; the extinguishing substance will form a dense extinguishing fog within the chamber and provide protection against propagation of flames or explosions downwardly into the filter 1.

The flame or explosion detector D, connected by line 20 to the valve 9 or 14, respectively, provides response of the respective valve via an electrical control pulse, so that the response of the valve can be faster than the propagation of a flame or explosive front through the conveying duct 2. The spacing between the detector D and the safety separating arrangement S (FIG. 1) or S' (FIG. 3) should be so selected to permit the valves to react, under control of the electrical signal, propagating at electrical speed before a flame or explosive front is propagated into the chamber 3 after having been also deflected 180° and, for example, also severed the cap 4 to fly to the position 4'.

Various changes and modifications may be made, and features described in connection with one of the embodiments may be used with any of the others, within the scope of the inventive concept.

We claim:

1. Safety device to relieve explosive pressures due to unintended explosion of explosive fluid media passing through a conveying duct (2, 5) having
    a chamber (3) formed with a releasable closure (4) which, under influence of explosive pressure, can release and thus open the chamber;
    an inlet duct (2a) terminating in said chamber,
    said inlet duct being spaced from the walls of the chamber, said inlet duct having outer walls defining a fluid passage space in said chamber;
    an outlet duct (5a) leading from said fluid passage space in the chamber; and
    detector means (D) for detecting a flame or explosion,
    and comprising, in accordance with the invention,
    a rapid-acting separating means (S, 6; S', 15) positioned between said walls and in said fluid passage space leading to said outlet duct (5a), said flame or explosion detector means (D) being coupled to said separating means for activating said separating means upon sensing a flame or explosion and thereby separating the inlet and outlet ducts;
    and wherein said separating means (S, 6) comprises a projectable membrane means (6) secured to one of said walls and radially projectable towards the other of said walls to thereby separate said chamber and isolate the inlet duct from the outlet duct.

2. The safety device of claim 1, wherein said detector means (D) provides an electrical output;
    electrical connection lines (20) are provided coupling the detector means to the rapid-acting separating means (S, 6; S', 15); and said detector means are physically separated from said rapid-acting separating means by a distance sufficient to provide for response of said rapid-acting separating means upon receiving an electric output signal from said detector means in advance of or concurrently with propagation of an explosion through said conveying duct.

3. The safety device of claim 1
    wherein the walls defining said chamber are internally essentially smooth and free from projections; and
    wherein said chamber (3) has an outlet which is located opposite the outlet of the inlet duct termination (2a) so that flow of the fluid medium through the chamber is in counter flow direction with respect to flow through the inlet duct (2a), said flow reversing into oppositely directed flow when passing through said chamber, said oppositely directed flow being selectively interruptable or severable upon operation of said rapid-acting separating means.

4. Safety device to relieve explosive pressures due to unintended explosion of explosive fluid media passing through a conveying duct (2, 5) having
    a chamber (3) formed with a releasable closure (4) which, under influence of explosive pressure, can release and thus open the chamber;
    an inlet duct (2a) terminating in said chamber,
    said inlet duct being spaced from the walls of the chamber, said inlet duct having outer walls defining a fluid passage space in said chamber;
    an outlet duct (5a) leading from said fluid passage space in the chamber; and
    detector means (D) for detecting a flame or explosion,
    and comprising, in accordance with the invention,
    a rapid-acting separating means (S, 6; S', 15) positioned between said walls and in said fluid passage space leading to said outlet duct (5a), said flame or explosion detector means (D) being coupled to said separating means for activating said separating means upon sensing a flame or explosion and thereby separating the inlet and outlet ducts;
    and wherein the rapid-acting separating means (S, 6) comprises an approximately ring-shaped elastic membrane (6) projectable from one of said walls to the other of said walls, and operating means (8, 9, 10) acting on said membrane for projecting said membrane across said chamber and between said walls for separating said inlet and outlet ducts.

5. The safety device of claim 4, wherein the operating means comprises fluid pressure means (8, 10) distending said membrane (6).

6. The safety device of claim 4, wherein said membrane is secured to one of said walls defining said chamber;
    and wherein the operating means distend the membrane and engage the membrane with the wall opposite said one wall.

7. The safety device of claim 4, wherein the membrane is secured to one of said walls defining the chamber, and, in quiescent, non-operating condition, is essentially flush with said wall.

8. The safety device of claim 4, wherein the inlet duct (2a) comprises an elongated cylindrical portion (2a) coaxial to and circumferentially equidistant to the membrane (6).

9. The safety device of claim 4, wherein the operating means comprises a fluid pressure source (10) and valve means (9) selectively interrupting or opening an outlet from said fluid pressure source towards the membrane (6) for distending the membrane and separating the chamber into two chamber portions and thereby separating the inlet and outlet ducts.

10. The safety device of claim 9, wherein said explosion detector means (D) is coupled to said valve means for opening the valve means upon detection of flame or explosion.

11. The safety device of claim 4
wherein the walls defining said chamber are internally essentially smooth and free from projections; and
wherein said chamber (3) has an outlet which is located opposite the outlet of the inlet duct termination (2a) so that flow of the fluid medium through the chamber is in counter flow direction with respect to flow through the inlet duct (2a), said flow reversing into oppositely directed flow when passing through said chamber, said oppositely directed flow being selectively interruptable or severable upon operation of said rapid-acting separating means.

12. The safety device of claim 4, wherein said detector means (D) provides an electrical output;
electrical connection lines (20) are provided coupling the detector means to the rapid-acting separating means (S, 6; S', 15); and
said detector means are physically separated from said rapid-acting separating means by a distance sufficient to provide for response of said rapid-acting separating means upon receiving an electric output signal from said detector means in advance of or concurrently with propagation of an explosion through said conveying duct.

13. Safety device to relieve explosive pressures due to unintended explosion of explosive fluid media passing through a conveying duct (2, 5) having
a chamber (3) formed with a releasable closure (4) which, under influence of explosive pressure, can release and thus open the chamber;
an inlet duct (2a) terminating in said chamber,
said inlet duct being spaced from the walls of the chamber, said inlet duct having outer walls defining a fluid passage space in said chamber;
an outlet duct (5a) leading from said fluid passage space in the chamber; and
detector means (D) for detecting a flame or explosion,
and comprising, in accordance with the invention,
a rapid-acting separating means (S, 6; S', 15) positioned between said walls and in said fluid passage space leading to said outlet duct (5a), said flame or explosion detector means (D) being coupled to said separating means for activating said separating means upon sensing a flame or explosion and thereby separating the inlet and outlet ducts,;
and wherein said separating means (S, 6) comprises a mechanical means (6) radially projectable across the fluid passage space in said chamber from one of said walls towards the other.

14. The safety device of claim 13, wherein said detector means (D) provides an electrical output;
electrical connection lines (20) are provided coupling the detector means to the rapid-acting separating means (S, 6; S', 15); and
said detector means are physically separated from said rapid-acting separating means by a distance
- sufficient to provide for response of said rapid-acting separating means upon receiving an electric output signal from said detector means in advance of or concurrently with propagation of an explosion through said conveying duct.

15. The safety device of claim 13
wherein the walls defining said chamber are internally essentially smooth and free from projections; and
wherein said chamber (3) has an outlet which is located opposite the outlet of the inlet duct termination (2a) so that flow of the fluid medium through the chamber is in counter flow direction with respect to flow through the inlet duct (2a), said flow reversing into oppositely directed flow when passing through said chamber, said oppositely directed flow being selectively interruptable or severable upon operation of said rapid-acting separating means.

* * * * *